March 19, 1968  G. SCHAEFFLER  3,374,040
ANTIFRICTION BEARINGS WITH CYLINDRICAL ROLLERS
Filed Aug. 15, 1966
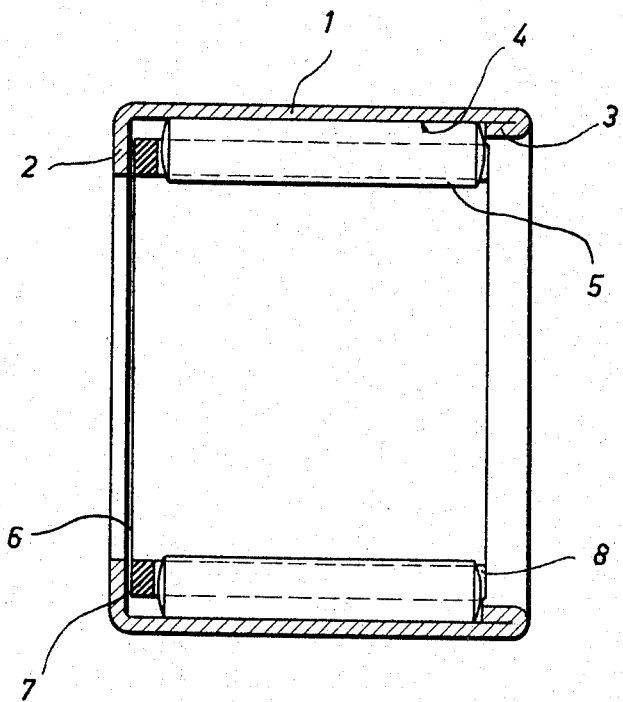
*Inventor:*
GEORG. SCHAEFFLER
BY
Hammond and Littell
ATTORNEYS

United States Patent Office 3,374,040
Patented Mar. 19, 1968

3,374,040
ANTIFRICTION BEARINGS WITH
CYLINDRICAL ROLLERS
Georg Schaeffler, Herzogenaurach, Germany, assignor to Industriewerk Schaeffler OHG, Herzogenaurach, Germany, a corporation of Germany
Filed Aug. 15, 1966, Ser. No. 572,279
Claims priority, application Germany, Sept. 7, 1965, J 14,183
2 Claims. (Cl. 308—213)

The invention relates to antifriction bearings with cylindrical rollers, particularly needle bearings, having a thin-walled outer race with rims at both ends and a cage accommodating the rollers.

The starting material for the production of known outer races for such bearings is a sleeve cut from a thin-walled tube. One axial end of this sleeve which has a greater length than that of the finished race is flanged in the next working step to form a radial or almost radially directed rim. However, before the other rim can be formed on in subsequent working steps to produce the final outer race, the cage accommodating the rollers must be installed. This process requires that prior to the insertion of the cage, the unfinished race is subjected to a thermal treatment to obtain the desired hardness of the raceway. Care has to be exercised so that this hardening process does not extend to that particular portion of the sleeve which later on has to be deformed to form a rim. This, however, requires that this rim has to remain pliable so that it can be flanged later on. A subsequent hardening of this rim is possible only at considerable expense since the cage containing the rollers has to be inserted before the rim in flanged. Consequently, this rim is usually left pliable and therefore is subjected to very heavy wear. Various suggestions have been advanced to eliminate these undesirable effects. For example, it was proposed to simultaneously harden the finished race and the cage which has already been inserted in the outer race. Unfortunately, this process has further undesirable results, since this method makes it extremely difficult to polish the roller raceway after the hardening is completed and it is not possible to utilize a plastic cage.

Usually, so-called window-cages have been utilized by the prior art in bearings of this type. In these cages, the rollers are disposed in cage pockets defined by two longitudinal sides disposed diametrically opposite to one another and on their interfaces by the sidewalls of the pockets. These cages can be made of metal or of plastic. For the construction of metal cages, several non-cutting and/or machining steps are necessary, of which at least some have to be executed with utmost accuracy to effect proper guidance and locking areas.

Plastic window cages can be produced in an injection mold in a single working step but these molds have a complicated structure, because a special forming die is necessary for the shaping of each pocket, which die must be arranged radially in the mold so that it can be introduced into the mold or removed therefrom.

It is an object of the invention to provide a novel anti-friction bearing which is easily and economically manufactured.

This and other objects and advantages of the invention will become obvious from the following detailed description.

The anti-friction bearing of the invention for cylindrical rollers, particularly needle bearings, is comprised of a thin-walled outer race with rims at both ends, one of the said rims being directed substantially radially inwardly and the other is directed axially inwardly to the bearing with the height of the latter rim corresponding approximately with the wall thickness of the race, a comb-cage therein with an outer diameter identical to or smaller than the inner diameter of the rim directed axially inwardly to the bearing and with the end ring connecting the bars of the cage abutting against the radially directed rim and cylindrical rollers between the bars of the cage which abut directly against the rim directed axially inwardly to the bearing.

Axial guidance of the rollers is provided by abutment at one end against the end ring of the cage and by abutment at the other end against the rim directed axially inwardly to the bearing.

Races and plastic cages having the specific characteristics of the invention are already individually known, but a particularly economical and unexpectedly advantageous bearing is produced by combining these two bearing elements, and each construction unit can be entirely finished prior to the assembly of all parts. The race and cage have characteristics which depend on each other and are necessary for a cooperational functioning. Therefore, it is necessary that the thin-walled race have a radially or nearly radially directed rim pointing inwardly to the bearing, against which rim the end ring of the comb-cage, connecting the bars retaining the rollers, can abut in the same direction to guide this comb-cage. The guidance of the comb-cage in the other axial direction is effected in connection with the rollers over the other rim directed inwardly to the bearing, so that a construction unit with inserted rollers results. To utilize the possibility, as provided by the plastic cage, to adjust the sides of the pockets to the roller shape most extensively, it is necessary to select a cage whose shape makes it possible to secure the rollers in the pockets after the cage has been inserted in the race. This is not possible for window-cages of the known art, whose side faces of the pockets are closely conformed to the shape of the rollers, so that an elastic retraction of the bars to such an extent to permit the rollers to be snapped into the pockets past the projections is no longer possible. In a comb-cage, however, such extensive elastic retraction of the bars is possible, because they are interconnected by an end ring only on one side, so that the securing of the rollers even at the closest conforming of the pocket sides to the roller shape is possible without any difficulties.

Moreover, the present race and comb-cage show still further advantages over other known forms. For example, the race which can be deep-drawn from a disc, which results simultaneously in one radially directed rim without any further working step can be completely hardened by thermal treatment immediately after the deflection of the other rim directed inwardly to the bearing without the necessity to exclude some parts from the hardening. If required, the raceway can then be polished. The manufacture of the cage itself calls for a simple mold consisting merely of two parts axially slideable into one another. After the molten material has been injected into the two mold halves and the material has hardened, the two mold halves need only be separated to obtain the completed cage. The assembly of the bearing necessitates only the insertion of the comb-cage, the outer diameter of which is either identical to or smaller than the inner diameter of the rim pointing inwardly to the bearing, and the securing of the rollers between the bars of the comb-cage according to the known art.

The figure illustrates one construction from of the present invention.

In the figure, thin-walled outer race 1 has a radially inwardly directed rim 2 at one axial end and the other axial end of the race is provided with a rim 3 directed axially inwardly to the bearing. The height of rim 3 corresponds approximately to the wall thickness of the race. The rollers 5 retained in the comb-cage 6 roll on the raceway 4 of outer race 1 and the outer diameter of the comb-cage 6 is either identical to or smaller than the inner diameter of rim 3 pointing inwardly to the bearing. The end ring 7 of the said comb-cage which interconnects the bars 8 retaining the rollers 3 between them, abuts against radially inwardly directed rim 2. In the other axial direction, the rollers 4 abut directly against rim 3 pointed inwardly to the bearing.

Various modifications of the bearings of the invention may be made without departing from the spirit or scope thereof and it is to be understood that the invention is to be limited only as defined in the appended claims.

I claim:

1. An antifriction bearing comprised of a thin-walled outer race with rims at both ends, one of the said rims being directed substantially radially inwardly and the other is directed axially inwardly to the bearing and the height of the latter rim corresponding approximately with the wall thickness of the race, a comb-cage therein with an outer diameter identical to or smaller than the inner diameter of the rim directed axially inwardly to the bearing and with the end ring connecting the bars of the cage abutting against the radially directed rim and cylindrical rollers between the bars of the cage which abut directly against the rim directed axially inwardly to the bearing.

2. The bearing of claim 1, wherein the rollers are needle bearings.

References Cited

FOREIGN PATENTS 1,009,445   3/1954   Germany.
888,197   1/1962   Great Britain.

MARTIN P. SCHWADRON, *Primary Examiner.*

F. SUSKO, *Assistant Examiner.*